Jan. 2, 1968 W. M. SHARPLESS 3,361,597

METHOD OF FORMING A PHOTODIODE

Filed Dec. 20, 1963

INVENTOR
W. M. SHARPLESS
BY
[signature]
ATTORNEY 3,361,597
Patented Jan. 2, 1968

3,361,597

METHOD OF FORMING A PHOTODIODE

William M. Sharpless, Fair Haven, N.J., assignor to Bell Telephone Laboratories, Incorporated, New York, N.Y., a corporation of New York Filed Dec. 20, 1963, Ser. No. 332,168
1 Claim. (Cl. 148—1.5)

This invention relates to point contact photodiodes and to a process for their fabrication.

Since the advent of the optical maser, or laser, considerable interest has developed in the field of optical carrier communication systems. The term optical communication system as used herein refers to a system involving electromagnetic radiation in the infrared, visible, and ultraviolet frequency ranges. One important component of such a system is the transducer provided for detecting signal information which is typically contained in modulation impressed on the optical carrier. In order that the increased bandwidth afforded by the use of optical carriers be fully utilized, detectors are required which can function in the microwave range.

Fundamental optical detection means, including photomultiplier devices and cadmium sulfide or selenium cells, are characterized by transit times and speeds of response which impose limitations on their use as detectors in optical communication systems involving microwave modulation. More recently developed detectors, such as those described in United States Patent 2,956,160, issued to me on Oct. 11, 1961, comprise point contact type crystal rectifiers in which a thin p-type semiconductive disk and an n-type point contact provide the rectifying junction, such devices being designed primarily to detect signals in the microwave range.

Typically included in the process of fabrication of such microwave rectifiers is a step known as "forming" in which the electrical characteristics of the assembled component are permanently altered. In the past, this forming step has involved either the application of electrical pulses across the rectifiying barrier or physical tapping of the cartridge. Such forming procedures are necessary to produce an acceptable voltage-current characteristic for the diode when used as a microwave detector. Diodes formed in this manner can operate as photodiodes if optical energy is incident on the rectifying junction. However, the photocurrent of such diodes does not exceed the value corresponding to a quantum efficiency of one. By using a forming technique in accordance with the present invention, the photocurrent can be increased through a current multiplication mechanism.

It is therefore the object of the present invention to form a photodetector in a manner producing improved sensitivity to amplitude variations of optical energy incident thereon.

Existing non-photodiodes used as microwave detectors typically are characterized by a signal loss factor and a noise factor. When such diodes are employed in receivers, a strong local or beating oscillator signal of approximately one milliwatt power level is supplied at the receiver, with the quality of the detector diode being then characterized by a conversion loss and a noise ratio which are a function of the local and received power levels.

Similarly, when photodiodes are used as detectors, a local optical oscillator signal, again typically of one milliwatt power level, is applied simultaneously with the incoming signal, such a local signal level being at least 20 decibels above typical incoming signal power levels. In accordance with the present invention, a point contact semiconductive transducer is electrically formed by applying a collimated beam of phase coherent optical energy beneath the seat of rectification. The power level of the incident beam directly beneath the point contact while forming is between three and five times greater than the typical operating power level in order that the diode characteristics will not vary in the presence of the normal operating level of local oscillator and received signal powers. Typical forming powers are therefore between three and five milliwatts. A typical source of such energy is an optical maser. As a result of forming at the higher power level, photocurrent generated in the diode by illumination at the typical optimum operating power level is increased by a factor of three to five over the current predicted for a unity quantum efficiency within the material. Thus the forming process in accordance with the invention produces photodiodes which show significant current multiplication.

In a preferred embodiment, the rectifying transducer comprises a diode in which a germanium substrate overlaid with epitaxial germanium is hollowed out to a thickness of microns at its center. A point contact of lightly doped gold ribbon contacts the epitaxial layer over the thinnest portion of the hollowed area. The entire assembly is housed in a cylindrical cartridge one end of which is a hollow tube to permit the radiation containing the signal to be detected to illuminate the area beneath the seat of rectification and, in accordance with the present invention, to allow diode forming by optical frequency illumination of the underside of the rectification region.

The above and other objects of the invention, together with its various features and advantages will be more completely understood upon reference to the accompanying drawing and to the detailed description thereof which follows.

Figure 1:
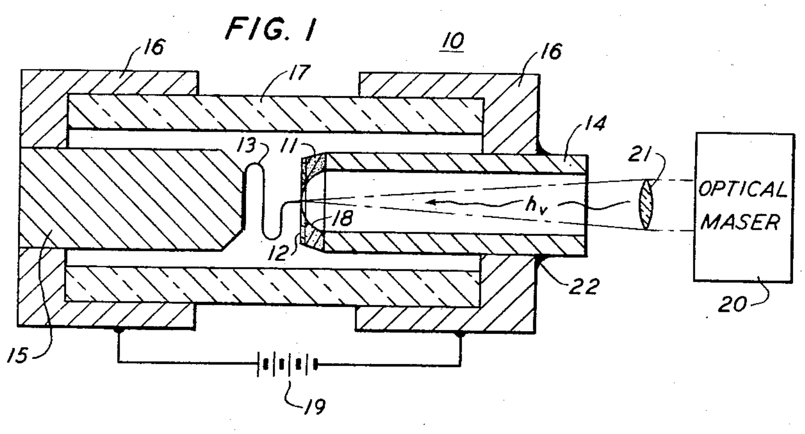
FIG. 1 is a longitudinal cross sectional view of a photodiode in accordance with the invention.

Referring now to FIG. 1 in detail, the photodetector 10 comprises a cartridge type case in which a point contact semiconductor diode is mounted. The diode comprises a base substrate 11 such as a 5 mil thick disk of single crystal p-type germanium heavily doped with gallium to have a resistivity of approximately .0017 ohm cm., with a layer 12 of epitaxial p-type germanium of resistivity approximately 30 ohm cm. and thickness typically 10 microns, deposited on the upper surface thereof. A point contact element 13 of gold foil, doped with an n-type impurity such as, for example, arsenic, is bonded to the upper surface of layer 12 by an electrical forming process to be described in a later portion of this specification. Contact element 13 possesses spring-like resiliency due to its physical configuration, as shown in FIG. 1.

The semiconductive base wafer, which is considered to consist of substrate 11 and epitaxial layer 12, is mounted on the end of hollow metallic rod 14 while point contact spring 13 is mounted on the end of solid metallic rod 15, both rods being positioned into round steel capped tube holder 16 from opposite ends thereof, the holder including an insulating quartz sleeve 17. Thin wall fused quartz sleeve 17 provides a low-loss, low capacity insulating section which is relatively free from mechanical changes due to temperature variations. Solid metallic rod 15 can be of nickel, while hollow rod 14 typically is of Kovar, an iron (54%), cobalt (15%), and nickel alloy having a coefficient of expansion approximately equal to that of germanium and other similar semiconductors.

In order to permit efficient photodiode operation, a cavity 18 is hollowed out from the wafer base, the cavity extending through substrate 11 and into epitaxial layer 12. Cavity 18 is positioned such that the thinnest portion of layer 12 is opposite the tip of contact spring 13.

One specific method for fabricating the photodiode described above involves a series of steps, the first of which is the epitaxial deposition of a thin layer, 8 to 10 microns thick, of high resistivity germanium on one surface of a block of germanium substrate material which is typically of low resistivity p-type conductivity. A typical method of epitaxially depositing semiconductive material is disclosed in application Ser. No. 35,152 of Kleimach et al. filed June 10, 1960, and assigned to the assignee of this application. After epitaxial deposition is complete, the composite block is ultrasonically diced into 1/32 inch diameter 5 mil thick disk wafers. Each finished germanium wafer is soldered, epitaxial layer out, to the end of a 1/32 inch diameter hollow Kovar tube, which is about 5/32 inch long and has a center hole of 20 mils diameter. Only sufficient solder is supplied to the germanium-nickel joint to cover the actual annular contact area, the remainder of the wafer underside being thus left clear for jet etching by a process essentially the same as that described by R. P. Riesz and C. G. Bjorling at page 889 of "Review of Scientific Instruments" August 1961. The underside of the germanium base wafer is etched away using a 1 percent NaOH aqueous solution and a D-C current of about 0.7 milliampere. The 10 mil diameter jet stream pressure is about one pound per square inch and the time required to etch away the dome shaped cavity 17 is typically between 6 and 10 minutes. The etching process continues until the formation of a red dot can be seen in the center of the germanium sample using an optical viewing device such as a microscope for observation. The red dot typically appears when the sample thickness is reduced to approximately one micron, a thickness sufficiently small to allow an optically detectable amount of a light beam impinging on the top of the sample to be transmitted by the germanium. Other monitoring processes, for example involving photomultipliers, could be used if desired. When the required thickness is attained, the etching process is stopped and the assembly is washed well in hot alcohol to remove all NaOH.

The end of tube 14, later to be soldered to cartridge 16, is now tinned during which operation a jet of a noncorrosive and deoxidizing gas mixture such as 85 percent nitrogen and 15 percent hydrogen impinges on the germanium crystal to prevent oxidation and to keep it cool. After the tinning is completed, the crystal is cleaned with methyl alcohol. The tube-mounted wafer of germanium is now ready to be placed within the cartridge case 16. The epitaxial surface is first fizz etched using 5 percent NaOH (50 cc.) and $H_2O_2$ (20 cc.) at room temperature for 8 to 10 seconds, rinsing immediately thereafter in distilled water. The crystal assembly is next soldered into the cartridge holder by means of fillet 22, the inside of the cartridge being flushed with the nitrogen-hydrogen gas mixture during the soldering operation. The cartridge is kept filled with this gas mixture by corking until the diode assembly is completed.

The point to be used for electrical contact, which comprises gold ribbon 6 mils wide and ½ mil thick doped with 1 percent by weight arsenic, is soldered in place on the end of rod 15 and is inserted into the gas filled cartridge, the tip of the contact which has been sharply pointed to have an area of 0.1 mil, being adjusted into position until it contacts the red dot area of the germanium wafer. The rod is then advanced 1.25 mils beyond contact position and the photodiode is ready for forming.

Figure 2A:
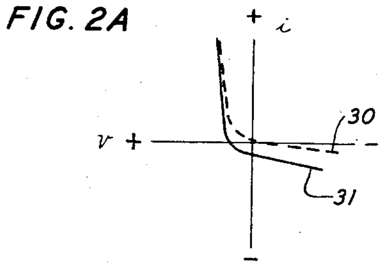
FIG. 2A is a graphical illustration of voltage-current characteristics for a diode formed in accordance with prior art techniques.

In prior art photodiode arrangements, electrical point contact forming processes typically involved the application of one or more short voltage pulses of several volts magnitude between the point and the semiconductor area. FIG. 2A is a graphical plot of the voltage-current characteristics of a photodiode formed in accordance with such prior art techniques. Curve 30 represents the low frequency response of the diode while curve 31 represents the response of the negatively biased diode when illuminated with incandescent light. The characteristic shown in curve 31 is seen to have a reverse current which is increased over that of curve 30 by the amount of generated photo current. Thus the detected current changes from a position on curve 30 to a position on curve 31 as the intensity of optical illumination increases from zero to its maximum value. This separation between the curves is relatively small, indicating a low sensitivity to changes in amplitude of the applied illumination.

In accordance with a preferred embodiment of the present invention, the forming process involves not electrical voltage pulsing but the illumination of the area beneath the rectifying region, through the hollow tube 14 of FIG. 1 by an optical maser such as the 6328 A. He-Ne gaseous laser.

The power level of the incident energy at the area beneath the point contact is selected to be at least three times the normal operating level of such a diode. Typically, the bias voltage for both the forming and the photodetection procedures is between −15 and −25 volts, and the optical forming power is 3 to 5 milliwatts. When operating as a photodetector the rectification region of the diode is advantageously illuminated with an intensity of one milliwatt.

In FIG. 1, the bias voltage is indicated by battery 19, and the optical forming source by optical maser 20, the output beam of which is focused onto the thinnest portion of the rectifier beneath point contact spring 13 by lens 21.

In a typical forming procedure in accordance with the invention, the static characteristics of the diode are displayed for example on a cathode ray oscilloscope. An alternating voltage sufficient to cause a few microamperes of current to flow through the diode, generally about one-half volt magnitude, is applied to verify that point contact is made and that the thinned portion of the diode is active. A negative voltage of approximately 22½ volts magnitude is then applied to the diode, and the required optical forming power is applied to the underside of the active rectifying region of the diode. This forming process continues for from 10 to 30 minutes during which the back current of the unformed diode decreases and the forward current increases until the characteristic viewed on the oscilloscope is stabilized. When stability is achieved the laser power and then the bias source are removed and the diode is ready for use as a photodetector for microwave frequencies present in optical frequency sources of illumination.

Figure 2B:
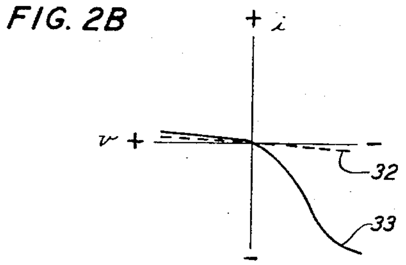
FIG. 2B is a graphical illustration of voltage-current characteristics for a photodiode formed in accordance with the present invention.

In FIG. 2B, the voltage- current relationship of a laser formed diode is graphically illustrated. Curve 32 indicates that, in the absence of applied light, the diode functions at low frequencies as a high resistance. Curve 33, the voltage current characteristic of a laser-formed photodiode illuminated by incandescent light, shows a significantly greater separation from nonilluminated response curve 32 than that of the prior art diode characteristic of FIG. 2A. Experimentally, this sensitivity has been found to increase by a factor of at least three. Typical diodes which, when formed in accordance with prior art techniques produce 250 microamperes of photocurrent per milliwatt of applied power, produce 800 microamperes per milliwatt when formed with an optical frequency beam.

The microwave detection capabilities of laser-formed diodes have been experimentally checked. Thus, using a ruby laser operating at 6940 A. as a source, microwave beat frequencies up to 30 gc. have been detected. Additionally, the output of a two meter long bromine-argon laser operating near 8500 A., when focused on the laser-formed diode, produced detectable microwave beats resulting from four separate and independent transition oscillations, the strongest being at 14 gc. and 19 gc.

It should be understood that the selection of the semiconductive materials used in the photodiode determine the optical frequency band over which efficient detection is possible. Thus while epitaxial germanium has been disclosed with reference to the drawing, other semiconductors, such as silicon carbide, silicon, gallium arsenide, indium antimonide and indium arsenide can be used.

An additoinal property of a photodiode formed in accordance with the present invention is a variable capacitance effect exhibited by it when biased with a negative voltage of tenths of volts and illuminated with optical radiation of varying intensity. Such a device could find significant application in the field of parametric amplification in which a variable reactance is typically employed as the active element. In such a device the diode would be pumped with a modulated optical source.

What is claimed is:

1. The method of forming a photodiode having a semiconductive region with first and second oppositely disposed surfaces and a point contact positioned on said first surface, said diode being designed for operation within a given range of operating currents; comprising the steps of applying an appropriate negative bias voltage, typically between —15 volts and —25 volts, between said region and said point, illuminating said second surface of said region over the area beneath said point with phase coherent optical maser wave energy, said energy having an intensity sufficient to cause currents to flow in said diode at least three times the greatest current value within said range, and removing said illumination and then said bias voltage when the electrical characteristics of said photodiode have stabilized.

References Cited

UNITED STATES PATENTS

| | | | |
|---|---|---|---|
| 3,018,423 | 1/1962 | Aarons | 148—186 |
| 3,122,463 | 2/1964 | Ligenza | 148—1.5 |
| 3,212,939 | 10/1965 | Davis | 148—1.5 |

FOREIGN PATENTS

| | | |
|---|---|---|
| 985,667 | 7/1966 | Great Britain. |

HYLAND BIZOT, *Primary Examiner.*